(12) United States Patent
Kasahara

(10) Patent No.: US 10,753,406 B2
(45) Date of Patent: Aug. 25, 2020

(54) FRICTIONAL ENGAGEMENT DEVICE

(71) Applicant: Honda Motor Co., Ltd., Tokyo (JP)

(72) Inventor: Takahiro Kasahara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 47 days.

(21) Appl. No.: 16/283,847

(22) Filed: Feb. 25, 2019

(65) Prior Publication Data

US 2019/0277349 A1   Sep. 12, 2019

(30) Foreign Application Priority Data

Mar. 6, 2018   (JP) ................................ 2018-040261

(51) Int. Cl.
| | |
|---|---|
| *F16D 25/12* | (2006.01) |
| *F16D 25/06* | (2006.01) |
| *F16D 48/02* | (2006.01) |
| *F16D 25/0638* | (2006.01) |

(52) U.S. Cl.
CPC ....... *F16D 25/123* (2013.01); *F16D 25/0638* (2013.01); *F16D 25/14* (2013.01); *F16D 2300/0214* (2013.01)

(58) Field of Classification Search
None
See application file for complete search history.

(56) References Cited

U.S. PATENT DOCUMENTS

| | | | | |
|---|---|---|---|---|
| 2,827,142 A | * | 3/1958 | Aschauer | ............. F16D 25/123 192/70.12 |
| 4,270,647 A | | 6/1981 | Leber | |
| 4,529,073 A | | 7/1985 | Lewis | |
| 4,759,432 A | * | 7/1988 | Jurgens | ............... F16D 25/0638 192/106 F |
| 2003/0155206 A1 | | 8/2003 | Arai et al. | |

(Continued)

FOREIGN PATENT DOCUMENTS

| | | |
|---|---|---|
| CN | 102066798 | 5/2011 |
| CN | 103703283 | 4/2014 |

(Continued)

OTHER PUBLICATIONS

"Office Action of China Counterpart Application", dated May 6, 2020, with English translation, p. 1-15.

*Primary Examiner* — Colby M Hansen
(74) *Attorney, Agent, or Firm* — JCIPRNET

(57) ABSTRACT

Provided is a frictional engagement device capable of preventing a momentum of oil supplied to a frictional engagement element from becoming excessive even when an outer diameter of the frictional engagement device (a clutch) is large or a rotation speed thereof becomes high due to a centrifugal force in accordance with rotation. When a piston moves toward the engagement position, a canceller spring cover is elastically deformed by a pressing force of the piston acting via a return spring, a contact portion of the canceller spring cover comes into contact with the contacted portion of a clutch hub, and thus an opening/closing portion of a first cooling oil path provided between the contact portion and the contacted portion is closed. Accordingly, the first cooling oil path can be closed through which the oil supplied to a frictional engagement portion flows in accordance with an engagement operation of the clutch.

12 Claims, 4 Drawing Sheets

(56) References Cited

U.S. PATENT DOCUMENTS

| | | | |
|---|---|---|---|
| 2004/0077449 A1 | 4/2004 | Biermann et al. | |
| 2007/0175726 A1* | 8/2007 | Combes | B60K 6/48 192/48.614 |
| 2008/0141806 A1* | 6/2008 | Metzinger | F16D 13/72 74/330 |
| 2008/0236978 A1* | 10/2008 | Kummer | F16D 25/123 192/48.1 |
| 2012/0118695 A1* | 5/2012 | Kawashima | F16D 25/123 192/48.609 |
| 2014/0345998 A1* | 11/2014 | Nakashima | F16D 48/02 192/3.57 |

FOREIGN PATENT DOCUMENTS

| | | |
|---|---|---|
| CN | 106195052 | 12/2016 |
| DE | 4136040 | 1/1993 |
| DE | 102011005724 | 9/2012 |
| JP | 2011052746 | 3/2011 |
| JP | 2016148349 | 8/2016 |
| WO | 2007142366 | 12/2007 |

\* cited by examiner

FRICTIONAL ENGAGEMENT DEVICE

CROSS-REFERENCE TO RELATED APPLICATION

This application claims the priority benefit of Japan application serial no. 2018-040261, filed on Mar. 6, 2018. The entirety of the above-mentioned patent application is hereby incorporated by reference herein and made a part of this specification.

BACKGROUND

Technical Field

The disclosure relates to a frictional engagement device such as a clutch including a frictional engagement element, and particularly to a frictional engagement device having an oil path which supplies lubrication or cooling oil to the frictional engagement element.

Description of Related Art

Conventionally, oil which is discharged from an oil pump driven by an engine lubricates a portion to be lubricated, cools a portion to be cooled, and supplies hydraulic pressure to a clutch (a frictional engagement device). For example, in a transmission gear box (a transmission), a cooling oil path, a lubricating oil path and a clutch oil path are formed, and oil is supplied into each of the oil paths to lubricate and cool each part constituting the transmission. As a specific example of such a transmission, Patent Document 1 shows a transmission in which a rotary shaft is rotatably supported in a transmission casing via a ball bearing and a gear is rotatably supported on an outer periphery of the rotary shaft via a radial needle bearing and a pair of thrust needle bearings.

Additionally, in a wet multiple disk type hydraulic clutch (a frictional engagement device) provided in the transmission and capable of connecting a gear to the rotary shaft, a plurality of oil holes are provided in a clutch hub to pass therethrough in a radial direction, oil is supplied to a frictional engagement element (a separator plate and a friction disk) through the oil holes by a centrifugal force due to rotation, the frictional engagement element can be cooled, and a spline fitting portion of the frictional engagement element with respect to a clutch guide and the clutch hub can be lubricated.

PATENT DOCUMENTS

[Patent Document 1] Japanese Unexamined Patent Application Publication No. 2016-148349

However, in the conventional clutch, when an outer diameter of the clutch is large and a rotation speed is high, a momentum of oil supply due to the centrifugal force may be excessive. Especially, when the outer diameter of the clutch is very large or the rotation speed is very high, a momentum of the oil supplied to the frictional engagement element becomes very strong, and damage such as peeling may occur on a friction material provided on a surface of the friction disk.

The disclosure has been made in view of the above-described problems, and the disclosure provides a frictional engagement device capable of preventing a momentum of oil supplied to a frictional engagement element from becoming excessive even when an outer diameter of the frictional engagement device (a clutch) is large or a rotation speed thereof becomes high.

SUMMARY

Accordingly, in the disclosure, a frictional engagement device 50 according to the disclosure includes a first rotary body 51 provided to be fixed to a rotary shaft 2, a second rotary body 52, 21 rotatably supported with respect to the rotary shaft 2, a frictional engagement element 55 having a plurality of friction members 53, 54 disposed between the first rotary body 51 and the second rotary body 52, a pressing member 58 configured to move to an engagement position in which the plurality of friction members 53, 54 are engaged with each other by a hydraulic pressure in an oil chamber 59, an elastic member 70 which is provided between the pressing member 58 and the second rotary body 52, 51 to be elastically deformable, a biasing member 62 interposed between the pressing member 58 and the elastic member 70 and configured to bias the pressing member 58 toward an engagement release position which releases engagement of the frictional engagement element 55, and a first oil path 91 formed between the second rotary body 52, 21 and the elastic member 70 and configured to allow oil supplied to the frictional engagement element 55 to flow therethrough, wherein, when the pressing member 58 moves toward the engagement position, the elastic member 70 is elastically deformed by a pressing force of the pressing member 58 acting via the biasing member 62, a contact portion 74 of the elastic member 70 comes into contact with the contacted portion 64 of the second rotary body 52, and thus an opening/closing portion 67 of the first oil path 91 provided between the contact portion 74 and the contacted portion 64 is closed.

DESCRIPTION OF THE EMBODIMENTS

Figure 1:
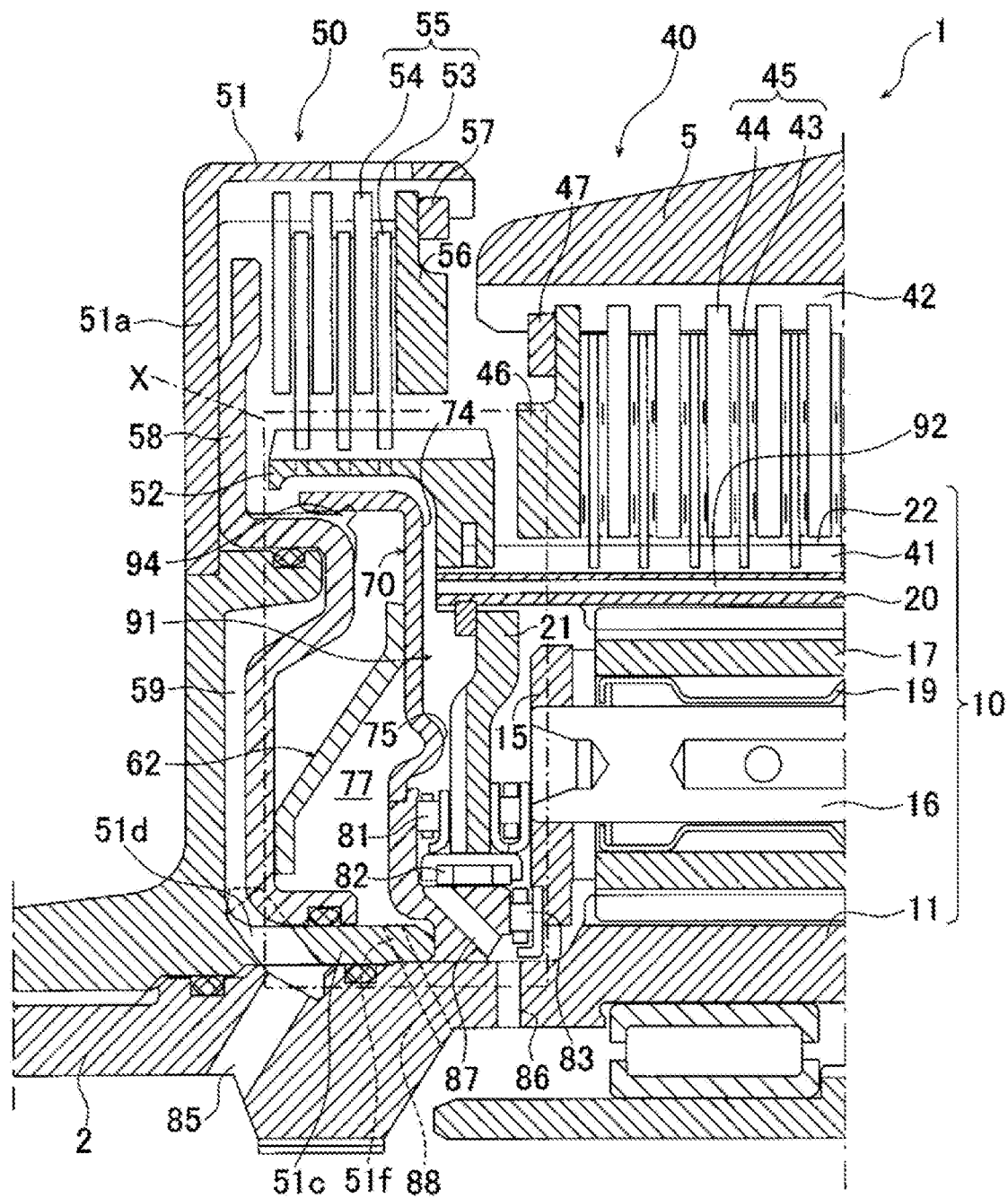
FIG. 1 is a cross-sectional view showing a part of a power transmission device including a clutch (a frictional engagement device) according to an embodiment of the disclosure.

According to the frictional engagement device of the disclosure, when the pressing member moves toward the engagement position, the elastic member is elastically deformed by the pressing force of the pressing member acting via the biasing member, the contact portion of the elastic member comes into contact with the contacted portion of the second rotary body, and thus the opening/closing portion of the first oil path is closed. Thus, it is possible to close the first oil path through which the oil supplied to the frictional engagement element flows in accordance with an engagement operation of the frictional engagement device. Therefore, even when an outer diameter of the frictional engagement device is large or a rotation speed thereof is high, it is possible to prevent a momentum of the oil supplied to the frictional engagement element from becoming excessive due to a centrifugal force in accordance with rotation of the first rotary body or the second rotary body.

Further, the frictional engagement device according to the disclosure may further include a second cooling oil path 92 branched from a branch portion 93 provided in the first oil path 91 and configured to supply the oil to another element 45 to be cooled which is different from the frictional engagement element 55, and the branch portion 93 may be provided on a side of the first oil path 91 which is upstream from the opening/closing portion 67 in an oil flowing direction.

With such a configuration, when the frictional engagement device is engaged, as the flow path of the oil to the frictional engagement element is closed, it is possible to supply the oil from the second oil path to another element to be cooled, instead of supplying the oil which has being supplied thus far from the first oil path to the frictional engagement element. Therefore, it is possible to prevent the momentum of the oil supplied to the frictional engagement element from becoming excessive and to effectively use the oil by supplying the oil to another element to be cooled.

That is, in the engagement of the frictional engagement device, the first and second rotary bodies are in a state capable of rotating at a high speed. Therefore, in the case in which the oil is supplied to the frictional engagement element as in the prior art, when the outer diameter of the frictional engagement device is large and the rotation speed thereof is high, the frictional engagement element may be damaged by excessive momentum of the oil supplied due to the centrifugal force. On the other hand, when the frictional engagement device is engaged, no heat is generated by friction at the frictional engagement portion, and thus active cooling is unnecessary.

Therefore, in the frictional engagement device according to the disclosure, the supply of the oil supplied to the frictional engagement element as described above is stopped by closing the flow path of the oil at the time of engagement in which the active cooling of the frictional engagement element is unnecessary. Therefore, it is possible to prevent the oil from being supplied forcefully to the frictional engagement element. In addition, it is possible to effectively utilize the oil by supplying the oil to another element to be cooled.

Also, in the frictional engagement device according to the disclosure, the elastic member 70 may be a member which defines an accommodating chamber 77 of the biasing member 62 formed between the pressing member 58 and the elastic member 70, and a seal member 94 which seals the accommodating chamber 77 may be interposed in a gap between the pressing member 58 and the elastic member 70.

Also, the frictional engagement device according to the disclosure may further include a protruding stopper portion 75 provided on the elastic member 70 and configured to protrude toward the second rotary body 21, and a receiving portion 65 provided on the second rotary body 21 and configured to bring the protruding stopper portion 75 into contact with the receiving portion. Further, in this case, the elastic member 70 may be configured such that an outer diameter side thereof is bent and deformed with respect to the rotary shaft 2 or a base portion 70a fixed to the first rotary body 51, and the protruding stopper portion 75 may be provided at a position closer to the base portion 70a than the contact portion 74. Further, the biasing member 62 may be a disk spring in which an inner diameter side end portion 62a is in contact with the pressing member 58 and an outer diameter side end portion 62b is in contact with the elastic member 70. Also, when the pressing force of the pressing member 58 acts on the elastic member 70 via the biasing member 62, the contact portion 74 comes into contact with the contacted portion 64, and then a part of the protruding stopper portion 75 comes into contact with the receiving portion 65.

With such configurations, when the contact portion of the elastic member comes into contact with the contacted portion of the second rotary body, the protruding stopper portion is not yet in contact with the receiving portion. When the pressing member further moves toward the engagement position from that state and the pressing force of the pressing member further acts on the elastic member via the biasing member, a portion between the contact portion and the base portion of the elastic member is deformed to be bent, the protruding stopper portion comes into contact with the receiving portion. Otherwise, even when the elastic member is deformed to be bent by inputting a disturbance factor such as vibration or rocking from the outside in a state in which the contact portion of the elastic member is in contact with the contacted portion of the second rotary body, the protruding stopper portion may come into contact with the receiving portion. Additionally, even when the pressing force of the pressing member further acts on the elastic member via the biasing member or the disturbance factor such as vibration and rocking is further input after the protruding stopper portion is in contact with the receiving portion, it is possible to suppress further bending deformation of the elastic member because the protruding stopper portion is in contact with the receiving portion.

Due to the contact of the protruding stopper portion, the contact portion of the elastic member is prevented from being excessively deformed, and thus excessive bending deformation of the elastic member does not occur. Therefore, since the displacement of the elastic member can be suppressed to a small extent, a sealing function of the accommodating chamber of the biasing member due to the seal member can be stabilized.

When the disturbance such as vibration is further applied in a state in which the contact portion of the elastic member is in contact with the contacted portion of the second rotary body, the elastic member is further displaced. At this time, further displacement of the elastic member is suppressed by the protruding stopper portion coming into contact with the receiving portion of the second rotary body, and it is possible to suppress the deformation of the elastic member or deterioration of the sealing function due to the seal member.

According to the frictional engagement device of the disclosure, it is possible to prevent a momentum of oil supplied to a frictional engagement element from becoming excessive even when an outer diameter of the frictional engagement device (a clutch) is large or a rotation speed becomes high.

Figure 2:
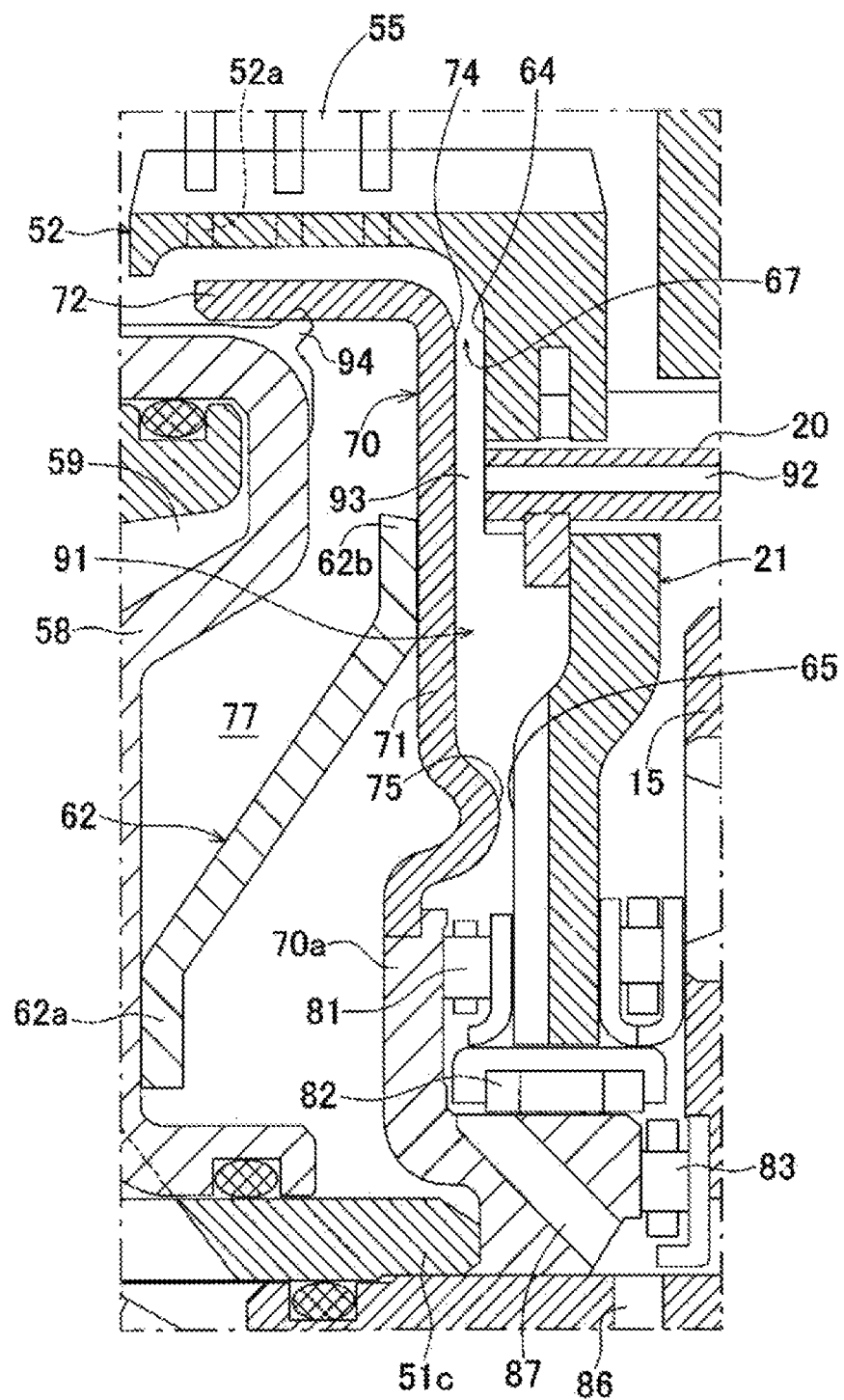
FIG. 2 is an enlarged view of a portion X in FIG. 1.

Hereinafter, an embodiment of the disclosure will be described in detail with reference to the accompanying drawings. FIG. 1 is a cross-sectional view showing a part of a power transmission device including a clutch (a frictional engagement device) according to an embodiment of the disclosure. Further, FIG. 2 is an enlarged view of a portion X in FIG. 1. The power transmission device 1 shown in FIG. 1 is a mechanism which changes rotation of a driving force of a drive source (not shown) such as an engine and a motor (an electric motor) mounted in a vehicle and transmits the changed rotation to a drive wheel (not shown) and includes a rotary shaft 2 installed in a casing 5, a planetary gear mechanism 10 disposed on the outer diameter side of the rotary shaft 2, a brake (a frictional engagement device) 40 installed on the outer diameter side of the planetary gear mechanism 10, and a clutch (a frictional engagement device) 50 provided at a position adjacent to the brake 40 in an axial direction of the rotary shaft 2. In the following description, an axial direction indicates the axial direction of the rotary shaft 2. In addition, a left side and a right side indicate the left side and the right side shown in each drawing.

The planetary gear mechanism 10 includes a sun gear 11, a planetary carrier (a carrier) 15, and a ring gear 20. The sun gear 11 is formed on an outer peripheral surface of one end (a right end) of the rotary shaft 2. A plurality of pinion shafts 16 and a pinion gear 17 rotatably supported on each of the pinion shafts 16 via a bearing 19 are provided in the carrier 15. The ring gear 20 has a brake hub (a brake inner) 41 having a plurality of external teeth 22 on an outer peripheral surface thereof, and a clutch hub (a clutch inner) 52 of the clutch 50 is integrally installed at one end portion thereof in the axial direction. The ring gear 20 and the clutch hub 52 are supported by a ring gear hub (a second rotary body) 21 installed on the inner diameter side of the ring gear 20 and the clutch hub 52. The ring gear hub 21 is a substantially circular plate-shaped member of which a surface extends in a radial direction.

The brake 40 includes a cylindrical brake drum 42 which is formed on an inner peripheral surface of the casing (a fixed member) 5, a plurality of brake plates (friction members) 44 which are formed of a circular annular flat plate engaged with an inner periphery of the brake drum 42, the brake hub 41 which is formed on an outer peripheral surface of the ring gear 20, disposed concentrically on the inner diameter side of the brake drum 42 and is relatively rotatable, and a plurality of brake disks (friction members) 43 formed of a circular annular flat plate engaged with an outer periphery of the brake hub 41. The brake plates 44 and the brake disks 43 are arranged alternately in an overlapping manner in the axial direction, and they constitute a frictional engagement portion 45. An end plate 46 is installed at one end portion (a left end portion) in a stacking direction of the brake plates 44 and the brake disks 43. A regulation member 47 which regulates movement of the end plate 46 is installed at a position adjacent to the left side of the end plate 46 (the side opposite to the frictional engagement portion 45).

Further, although not shown, a piston (a pressing member) is accommodated in the brake drum 42. The piston is installed to be relatively movable in the axial direction. A cylinder chamber is defined in a gap between the piston and the casing 5. Hydraulic oil is introduced into the cylinder chamber via an oil path. The piston is biased toward the side away from the frictional engagement portion 45 by a biasing force of a return spring.

In the brake 40, the brake plates 44 and the brake disks 43 are engaged with each other by driving the piston with a hydraulic pressure of the hydraulic oil supplied to the cylinder chamber, whereby the brake 40 is engaged. As a result, rotation of the ring gear 20 (the brake hub 41) is stopped. That is, the ring gear 20 is fixed to the casing 5.

The clutch 50 includes a bottomed cylindrical clutch guide (a first rotary body) 51 which is fixed to the rotary shaft 2 and rotates integrally with the rotary shaft 2, a plurality of clutch plates (friction members) 54 which are formed of a circular annular flat plate engaged with an inner periphery of the clutch guide 51, the clutch hub (a second rotary body) 52 which is provided integrally with the ring gear 20 and the ring gear hub 21, concentrically disposed on the inner diameter side of the clutch guide 51 and is relatively rotatable, and a plurality of clutch disks (friction members) 53 formed of a circular annular flat plate engaged with an outer periphery of the clutch hub 52. The clutch plates 54 and the clutch disks 53 are arranged alternately in an overlapping manner in the axial direction and constitute a frictional engagement portion (a frictional engagement element) 55. An end plate 56 is installed at one end portion (a right end portion) in a stacking direction of the clutch plates 54 and the clutch disks 53. A regulation member 57 which restricts movement of the end plate 56 is installed at a position adjacent to the right side (the side opposite to the frictional engagement portion 55) of the end plate 56.

A piston (a pressing member) 58 is accommodated in the clutch guide 51. The piston 58 is slidably installed on an outer periphery of a boss portion 51*c* of the clutch guide 51. An oil chamber 59 is defined between the piston 58 and the clutch guide 51. The piston 58 is biased toward the side away from the frictional engagement portion 55 by a biasing force of a return spring 62. The oil is supplied to the oil chamber 59 through an oil path 85 formed in the rotary shaft 2 and an oil path 51*d* formed in the boss portion 51*c* of the clutch guide 51.

A canceller spring cover (an elastic member) 70 is provided between the piston 58 and the clutch hub 52 and the ring gear hub 21. The canceller spring cover 70 integrally has a substantially disk-shaped main body portion 71 which extends from the outer peripheral surface of the rotary shaft 2 to the outer diameter side along the ring gear hub 21, and a substantially cylindrical tubular portion 72 which is formed by a tip end portion (an outer diameter end) of the main body portion 71 being bent and then extending along the clutch hub 52 toward the piston 58 and the clutch guide 51 in the axial direction.

The canceller spring cover 70 is formed of an elastic metallic material and is configured such that a portion on the outer diameter side (distal end side) is axially bent with a base portion 70*a* as a fulcrum when a load is received from the return spring 62 in the axial direction. Due to an elastic force (a biasing force) of the canceller spring cover 70, it is possible to obtain a cancellation effect (a centrifugal hydraulic pressure cancellation function) which suppresses the piston 58 from moving to an engagement position by a centrifugal force acting on the oil in the oil chamber 59.

The return spring (a biasing member) 62 which is a disk spring is accommodated in a spring accommodating chamber (a canceller oil chamber) 77 which is a space defined by the piston 58, the canceller spring cover 70, and the boss portion 51*c* of the clutch guide 51. An inner diameter side end portion 62*a* of the return spring 62 is in contact with the piston 58, and an outer diameter side end portion 62*b* thereof is in contact with the canceller spring cover 70. The piston 58 is biased in an engagement releasing direction in which the engagement (fastening) of the clutch 50 is released by the biasing force (a resilient force) of the return spring 62. Further, in the spring accommodating chamber 77, oil is supplied through an oil path 88 formed in the rotary shaft 2 and an oil path 51*f* formed in the boss portion 51*c* of the clutch guide 51. The canceller effect can also be obtained by opposing the centrifugal force acting on the oil in the oil chamber 59 with a pressure of the oil supplied into the spring accommodating chamber 77 through the oil path 88 and the oil path 51*f*.

A seal ring (a seal member) 94 is provided at a contact portion of the piston 58 with the tubular portion 72 of the canceller spring cover 70. The seal ring 94 is formed of an elastic annular rubber material or synthetic resin material and seals a gap between the piston 58 and the tubular portion 72 of the canceller spring cover 70. The seal ring 94 prevents the oil supplied from a first cooling oil path 91 to the clutch hub 52 from flowing into the spring accommodating chamber 77.

Further, bearings 81 and 82 are respectively interposed in a radial gap and an axial gap between the base portion 70a of the canceller spring cover 70 and the ring gear hub 21, and the canceller spring cover 70 and the ring gear hub 20 are supported to be rotatable relative to each other. A bearing 83 is interposed in an axial gap between the canceller spring cover 70 and the planetary carrier (the carrier) 15, and the canceller spring cover 70 and the planetary carrier 15 are also supported to be rotatable relative to each other.

Further, the clutch 50 has the first cooling oil path 91 formed between the clutch hub 52 and the ring gear hub 20 and the canceller spring cover 70. The first cooling oil path 91 is an oil path which supplies the oil supplied from an axis center of the rotary shaft 2 to the frictional engagement portion 55 by a centrifugal force due to rotation of the clutch hub 52. Further, the brake 40 includes a second cooling oil path 92 which is branched from the first cooling oil path 91 and supplies the oil to the frictional engagement portion 45 of the brake 40 (another element to be cooled which is different from the frictional engagement portion 55 of the clutch 50). The oil is supplied to the first cooling oil path 91 through an oil path 86 formed in the rotary shaft 2 and an oil path 87 formed in the base portion 70a of the canceller spring cover 70.

The oil supplied from the first cooling oil path 91 is supplied to the frictional engagement portion 55 through an oil hole 52a of the clutch hub 52, can lubricate a spline fitting portion of the frictional engagement portion 55 with respect to the clutch hub 52 and the clutch guide 51 and can cool the frictional engagement portion 55 which generates heat due to friction at the time of engagement.

Additionally, a space between a contact portion 74 provided near an outer diameter end of the main body portion 71 of the canceller spring cover 70 and a contacted portion 64 provided at a position facing the clutch hub 52 constitutes an opening/closing portion 67 which opens and closes a flow path to the downstream side (the frictional engagement portion 55 side) of the first cooling oil path 91. As will be described later, when the contact portion 74 of the main body portion 71 comes into contact with the contacted portion 64 of the clutch hub 52 by the canceller spring cover 70 being bent toward the clutch hub 52 due to the biasing force of the return spring 62, the opening/closing portion 67 of the first cooling oil path 91 can be closed.

Further, a protruding stopper portion 75 which protrudes toward the clutch hub 52 in the axial direction is formed at a position on the inner diameter side from the contact portion 74 of the main body portion 71 of the canceller spring cover 70. The stopper portion 75 comes into contact with a receiving portion 65 of the ring gear hub 21 provided at a facing position by the canceller spring cover 70 being bent toward the clutch hub 52 due to the biasing force of the return spring 62. Here, when the contact portion of the canceller spring cover 70 comes into contact with the contacted portion 64 of the clutch hub 52 and then additional bending deformation of the canceller spring cover 70 occurs, the stopper portion 75 comes into contact with the receiving portion 65.

The second cooling oil path 92 is an oil path which is branched from a branch portion 93 provided in the first cooling oil path 91 and is an oil path which supplies the oil to the frictional engagement portion 45 of the brake 40. The branch portion 93 which branches the second cooling oil path 92 from the first cooling oil path 91 is provided at a position on a side (the side closer to the oil paths 86 and 87) which is upstream from the opening/closing portion 67. Therefore, as will be described later, the second cooling oil path 92 can maintain an open state even when the opening/closing portion 67 of the first cooling oil path 91 is closed by the canceller spring cover 70 and can supply the oil supplied from the oil path 85 to the frictional engagement portion 45 of the brake 40.

Next, an operation of the clutch 50 having the above-described configuration will be described. Here, a case in which the clutch 50 is engaged/disengaged in a state in which the rotary shaft 2 and the clutch guide 51 are rotating will be described.

Figure 3:
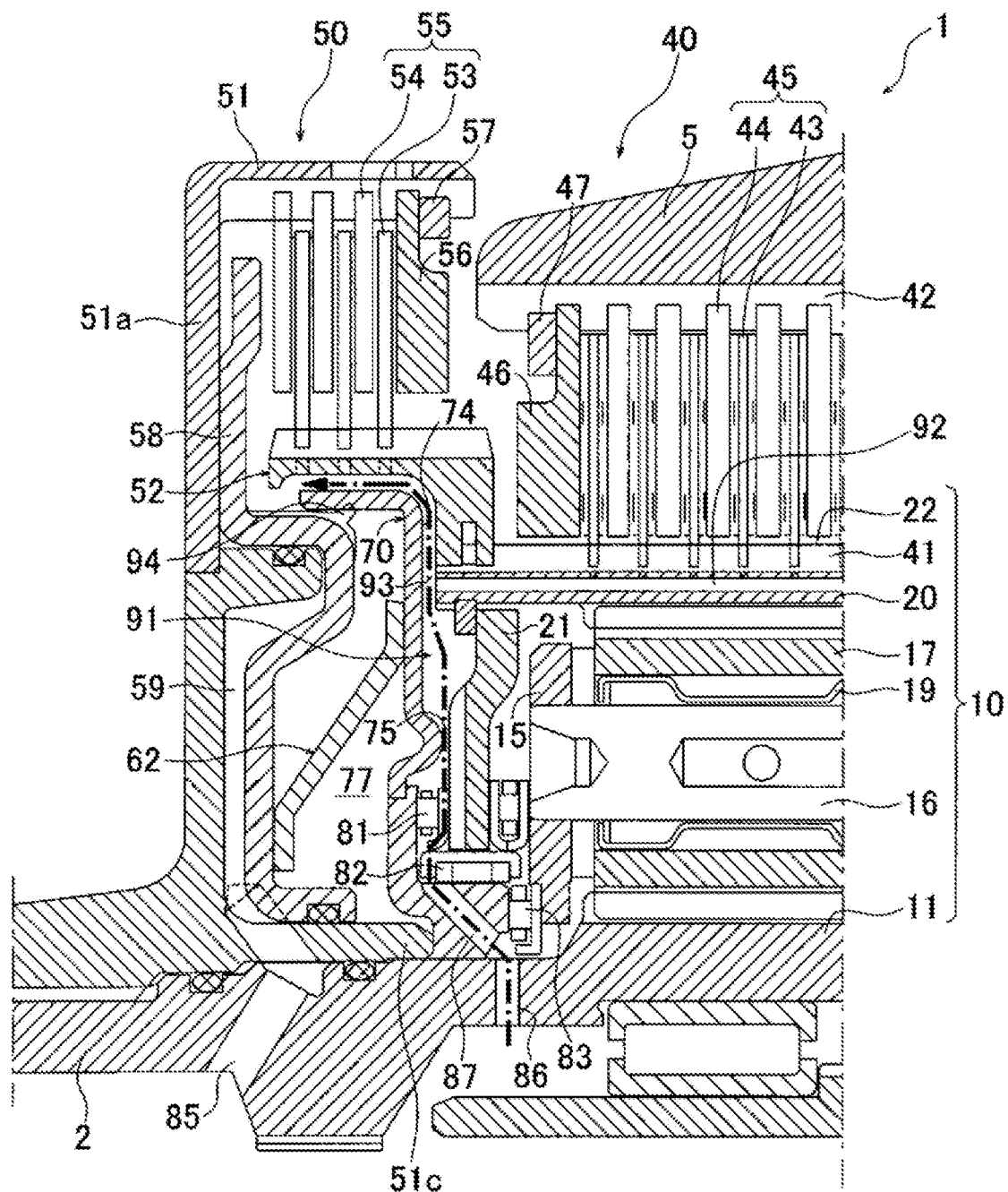
FIG. 3 is a view showing a state when a clutch is not engaged.

FIG. 3 is a view showing a state in which the clutch 50 is not engaged. When the clutch 50 is not engaged as shown in FIG. 3, the biasing to the piston 58 due to the oil supplied to the oil chamber 59 is not performed, the piston 58 is pressed toward a side wall portion 51a side of the clutch guide 51 by the resilient force of the return spring 62 and is located at a engagement release position in which the engagement of the frictional engagement portion 55 of the clutch 50 is released. Therefore, only the rotary shaft 2 and the clutch guide 51 are rotated, and the clutch hub 52 is not rotated and is stopped.

In this state, since the return spring 62 is not deformed, the resilient force of the return spring 62 does not reach the canceller spring cover 70. Therefore, the contact portion 74 of the canceller spring cover 70 is separated from the contacted portion 64 of the clutch hub 52, and the opening/closing portion 67 of the first cooling oil path 91 is in an open state (in a released state).

Since the opening/closing portion 67 of the first cooling oil path 91 is open, the oil flowing into the first cooling oil path 91 from the oil path 86 of the rotary shaft 2 passes through the opening/closing portion 67 and reaches the clutch hub 52.

Additionally, due to the stop of the rotation of the clutch hub 52, the oil which has reached the clutch hub 52 drips to the clutch guide 51 by gravity. Also, the dripping oil diffuses and reaches the frictional engagement portion 55 as the clutch guide 51 rotates. In this way, the lubrication and cooling of the frictional engagement portion 55 are performed.

Figure 4:
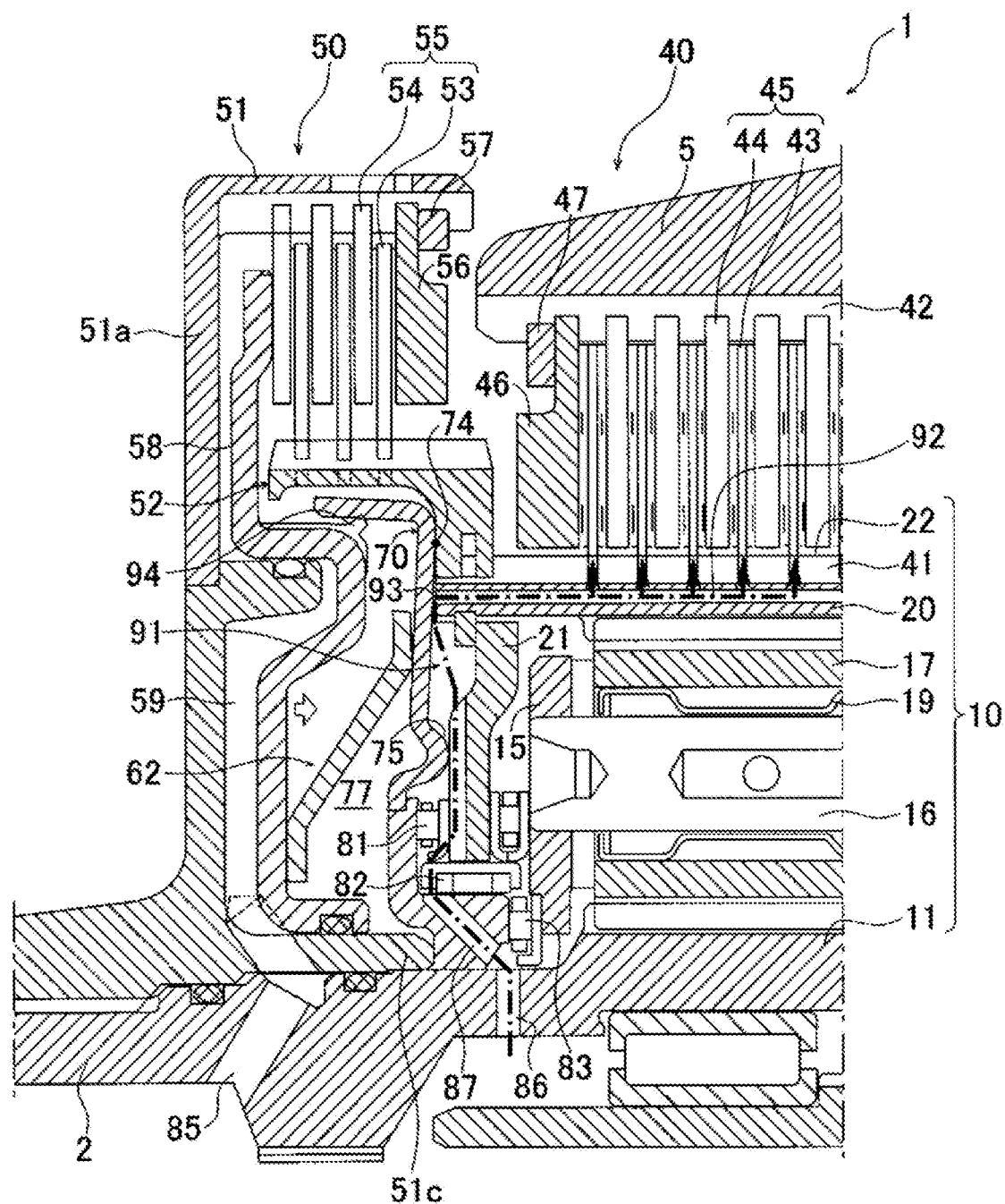
FIG. 4 is a view showing a state when the clutch is engaged.

FIG. 4 is a view showing a state in which the clutch 50 is engaged. In the clutch 50, the piston 58 is driven by the hydraulic pressure of the hydraulic oil supplied into the oil chamber 59 to engage the clutch plates 54 and the clutch disks 53 with each other, and thus the clutch 50 is engaged. Thus, the ring gear 20 and the clutch hub 52 and rotary parts (not shown) connected to the clutch guide 51 rotate together. That is, when the clutch 50 is engaged as shown in FIG. 4, the oil flows from the rotary shaft 2 into the oil chamber 59 through the oil path 85, and the piston 58 is biased by the hydraulic pressure in the oil chamber 59. Accordingly, the piston 58 moves to the engagement position in which the frictional engagement portion 55 is engaged, and the frictional engagement portions 55 are engaged with each other. Therefore, the clutch hub 52 rotates together with the clutch guide 51 in accordance with the rotation of the rotary shaft 2.

Further, when the piston 58 moves to the engagement position, a pressing force of the piston 58 acts on the canceller spring cover 70 via the return spring 62, and the bending deformation occurs at the canceller spring cover 70. Thus, the opening/closing portion 67 of the first cooling oil path 91 is closed by the contact portion 74 of the canceller spring cover 70 coming into contact with the contacted portion 64 of the clutch hub 52. The oil flowing through the first cooling oil path 91 flows from the branch portion 93 into the second cooling oil path 92 by the opening/closing portion 67 being closed. The oil flowing into the second cooling oil path 92 is supplied to the frictional engagement portion 45 of the brake 40.

Further, when the contact portion 74 of the canceller spring cover 70 comes into contact with the contacted portion 64 of the clutch hub 52, the stopper portion 75 is not yet in contact with the receiving portion 65. When the piston 58 further moves from this state to the engagement position and the pressing force of the piston 58 further acts on the canceller spring cover 70 via the return spring 62, the bending deformation occurs at a portion of the main body portion 71 of the canceller spring cover 70 between the contact portion 74 and the base portion 70a, and thus the stopper portion 75 comes into contact with the receiving portion 65. Otherwise, even when the canceller spring cover 70 is bent and deformed by inputting disturbance factors such as vibration and rocking from the outside in a state in which the contact portion 74 of the canceller spring cover 70 is in contact with the contacted portion 64 of the clutch hub 52, the stopper portion 75 may be brought into contact with the receiving portion 65. Additionally, even when the pressing force of the piston 58 further acts on the canceller spring cover 70 via the return spring 62 or the disturbance factors such as vibration and rocking are further input after the stopper portion 75 comes into contact with the receiving portion 65, the further bending deformation of the canceller spring cover 70 can be suppressed because the stopper portion 75 is in contact with the receiving portion 65.

Since it is possible to prevent the contact portion 74 of the canceller spring cover 70 from being excessively deformed such as being crushed or the like due to the contact of the stopper portion 75, there is no possibility of causing the excessive bending deformation in the canceller spring cover 70. Therefore, since displacement of the tubular portion 72 can be suppressed to a small extent, it is possible to stabilize a sealing function of a gap between the piston 58 and the tubular portion 72 of the canceller spring cover 70 (a sealing function of the spring accommodating chamber 77) by the seal ring 94.

When the disturbance such as vibration is further applied in a state in which the contact portion 74 of the canceller spring cover 70 is in contact with the contacted portion 64 of the clutch hub 52 in this way, the canceller spring cover 70 is further displaced. At this time, further displacement of the canceller spring cover 70 is suppressed by the stopper portion 75 coming into contact with the receiving portion 65 of the clutch hub 52, and it is possible to suppress the deformation of the canceller spring cover 70 or the deterioration of the sealing function by the canceller spring cover 70.

Further, in the embodiment, the return spring 62 is a disk spring in which an inner diameter side end portion 62a is in contact with the piston 58 and an outer diameter side end portion 62b is in contact with the canceller spring cover 70. As described above, since the outer diameter side end portion 62b of the return spring (the disk spring) 62 is in contact with the canceller spring cover 70, the outer diameter side of the canceller spring cover 70 can be pressed by the return spring 62 when the first cooling oil path 91 is closed. Therefore, since the canceller spring cover 70 can be displaced more effectively as compared with the configuration in which the inner diameter side end portion of the return spring 62 is in contact with the canceller spring cover, it is possible to more smoothly open and close the first cooling oil path 91 by the canceller spring cover 70.

As described above, according to the clutch 50 of the embodiment, when the piston 58 moves toward the engagement position, the canceller spring cover 70 is elastically deformed by the pressing force of the piston 58 acting via the return spring 62, the contact portion 74 of the canceller spring cover 70 comes into contact with the contacted portion 64 of the clutch hub 52, thus the opening/closing portion 67 of the first cooling oil path 91 provided between the contact portion 74 and the contacted portion 64 is closed, and it is possible to close the first cooling oil path 91 through which the oil supplied to the frictional engagement portion 55 flows in accordance with the engagement operation of the clutch 50. Therefore, even when an outer diameter of the clutch 50 is large or a rotation speed is high, it is possible to prevent a momentum of the oil supplied to the frictional engagement portion 55 in accordance with the rotation of the clutch hub 52 from becoming excessive.

Further, when the clutch 50 is engaged, as the flow path of the oil to the frictional engagement portion 55 is closed, it is possible to supply the oil from the second cooling oil path 92 to the frictional engagement portion 45 of the brake 40 which is another element to be cooled, instead of supplying the oil supplied thus far from the first cooling oil path 91 to the frictional engagement portion 55. Therefore, it is possible to prevent the momentum of the oil supplied to the frictional engagement portion 55 of the clutch 50 from becoming excessive, and it is possible to effectively use the oil by supplying the oil to another element to be cooled. Also, in the clutch 50 of the embodiment, a change of the oil flow path is realized by a simple configuration without using a special configuration such as a pump.

Although the embodiment of the disclosure has been described above, the disclosure is not limited to the above embodiment, and various modifications are possible within the scope of the claims and the technical ideas described in the specification and the drawings. For example, in the embodiment, the case in which the clutch hub 52 and the ring gear hub 21 which are the second rotary bodies of the disclosure are separate members has been described, but the disclosure is not limited thereto, and the second rotary bodies of the disclosure may be a member (a single member) integrally formed.

What is claimed is:

1. A frictional engagement device, comprising:
    a first rotary body provided to be fixed to a rotary shaft;
    a second rotary body rotatably supported with respect to the rotary shaft;
    a frictional engagement element having a plurality of friction members disposed between the first rotary body and the second rotary body;
    a pressing member configured to move to an engagement position in which the plurality of friction members are engaged with each other by a hydraulic pressure in an oil chamber;
    an elastic member which is elastically deformable and provided between the pressing member and the second rotary body;
    a biasing member interposed between the pressing member and the elastic member and configured to bias the pressing member toward an engagement release position which releases engagement of the frictional engagement element; and
    a first oil path formed between the second rotary body and the elastic member and configured to allow oil supplied to the frictional engagement element to flow therethrough,
    wherein, when the pressing member moves toward the engagement position, the elastic member is elastically deformed by a pressing force of the pressing member acting via the biasing member, a contact portion of the elastic member comes into contact with a contacted portion of the second rotary body, and thus an opening/closing portion of the first oil path provided between the contact portion and the contacted portion is closed.

2. The frictional engagement device according to claim 1, further comprising a second cooling oil path branched from a branch portion provided in the first oil path and configured to supply the oil to another element to be cooled which is different from the frictional engagement element,
wherein the branch portion is provided on a side of the first oil path which is upstream from the opening/closing portion in an oil flowing direction.

3. The frictional engagement device according to claim 2, wherein the elastic member is a member which defines an accommodating chamber of the biasing member formed between the pressing member and the elastic member, and
a seal member which seals the accommodating chamber is interposed in a gap between the pressing member and the elastic member.

4. The frictional engagement device according to claim 2, further comprising a protruding stopper portion provided on the elastic member and configured to protrude toward the second rotary body, and a receiving portion provided on the second rotary body and configured to bring the protruding stopper portion into contact with the receiving portion.

5. The frictional engagement device according to claim 1, wherein the elastic member is a member which defines an accommodating chamber of the biasing member formed between the pressing member and the elastic member, and
a seal member which seals the accommodating chamber is interposed in a gap between the pressing member and the elastic member.

6. The frictional engagement device according to claim 5, further comprising a protruding stopper portion provided on the elastic member and configured to protrude toward the second rotary body, and a receiving portion provided on the second rotary body and configured to bring the protruding stopper portion into contact with the receiving portion.

7. The frictional engagement device according to claim 1, further comprising a protruding stopper portion provided on the elastic member and configured to protrude toward the second rotary body, and a receiving portion provided on the second rotary body and configured to bring the protruding stopper portion into contact with the receiving portion.

8. The frictional engagement device according to claim 7, wherein the elastic member is configured such that an outer diameter side thereof is bent and deformed with respect to the rotary shaft or a base portion fixed to the first rotary body, and
the protruding stopper portion is provided at a position closer to the base portion than the contact portion.

9. The frictional engagement device according to claim 8, wherein the biasing member is a disk spring in which an inner diameter side end portion is in contact with the pressing member and an outer diameter side end portion is in contact with the elastic member.

10. The frictional engagement device according to claim 9, wherein, when the pressing force of the pressing member acts on the elastic member via the biasing member, the contact portion comes into contact with the contacted portion, and then the protruding stopper portion comes into contact with the receiving portion.

11. The frictional engagement device according to claim 7, wherein, when the pressing force of the pressing member acts on the elastic member via the biasing member, the contact portion comes into contact with the contacted portion, and then the protruding stopper portion comes into contact with the receiving portion.

12. The frictional engagement device according to claim 8, wherein, when the pressing force of the pressing member acts on the elastic member via the biasing member, the contact portion comes into contact with the contacted portion, and then the protruding stopper portion comes into contact with the receiving portion.

\* \* \* \* \*